US007086483B2

(12) United States Patent
Arimura et al.

(10) Patent No.: US 7,086,483 B2
(45) Date of Patent: Aug. 8, 2006

(54) ELECTRIC TOOL

(75) Inventors: Tadashi Arimura, Kyoto (JP); Hiroshi Miyazaki, Hikone (JP); Masatoshi Ito, Hikone (JP); Yukihiko Okamura, Hirakata (JP); Kenji Sakamoto, Toyonaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 38 days.

(21) Appl. No.: 10/925,004

(22) Filed: Aug. 25, 2004

(65) Prior Publication Data

US 2005/0045354 A1 Mar. 3, 2005

(30) Foreign Application Priority Data

Aug. 26, 2003 (JP) .............................. 2003-301812

(51) Int. Cl.
*E21B 44/00* (2006.01)
*E21B 44/04* (2006.01)
*B23Q 5/28* (2006.01)

(52) U.S. Cl. .......................... 173/217; 173/2; 173/180; 173/181

(58) Field of Classification Search .................... 173/2, 173/180, 181, 183, 217, 176; 81/467, 470; 364/174, 188, 474; 408/8, 9
See application file for complete search history.

(56) References Cited

U.S. PATENT DOCUMENTS

| | | | | |
|---|---|---|---|---|
| 5,277,261 | A * | 1/1994 | Sakoh | 173/176 |
| 5,713,250 | A * | 2/1998 | Hendricks et al. | 81/54 |
| 6,390,205 | B1 * | 5/2002 | Wallgren et al. | 173/2 |
| 6,536,536 | B1 * | 3/2003 | Gass et al. | 173/2 |
| 2003/0121685 | A1 * | 7/2003 | Yamamoto | 173/217 |

FOREIGN PATENT DOCUMENTS

JP 07-314342 A1 12/1995

* cited by examiner

*Primary Examiner*—Rinaldi I. Rada
*Assistant Examiner*—Nathaniel Chukwurah
(74) *Attorney, Agent, or Firm*—Rader, Fishman & Grauer PLLC

(57) ABSTRACT

An electric tool having the capability of achieving a high working efficiency is provided. This tool comprises an output shaft rotated by reversible motor, a rotational-direction switch for switching a rotational direction of the output shaft in either forward or reverse direction, first memory for storing a plurality of operation modes of the output shaft with respect to one of the forward and reverse directions, operation-mode switch for selecting one from the operation modes, second memory for temporarily storing an operation mode selected by the operation-mode switch in a use of the electric tool at the one of the forward and reverse directions; and a controller for automatically setting the electric tool in the operation mode stored in the second memory in the next use of the electric tool at the one of the forward and reverse directions.

9 Claims, 4 Drawing Sheets

ELECTRIC TOOL

BACKGROUND OF THE INVENTION

1. Field of the Invention

The present invention relates to an electric tool with operation modes for providing different outputs to an object, and particularly the electric tool for applying a rotational force to the object such as bolts, nuts and screws through an output shaft driven by a reversible motor.

2. Disclosure of the Prior Art

To carry out operations of tightening a fastening member such as a bolt, nut or a screw and loosening the fastening member, electric tools have been widely used. For example, an impact rotary driver is disclosed in Japanese Patent Early Publication No. 7-314342. According to this tool, when an output shaft is rotated in a forward direction by a reversible motor, the operation of tightening the fastening member can be performed. On the other hand, when the output shaft is rotated in the reverse direction, the operation of loosening the fastening member can be performed. In addition, the tool has the capability of intermittently providing an impact force to the fastening member at the finish of the tightening operation or at the start of the loosening operation. Therefore, it brings improvements in reliability and easiness of the tightening and loosening operations.

By the way, allowing this kind of tool to be available to the fastening members having different sizes improves working efficiency. For example, if the output shaft can be driven by a suitable one selected from a plurality of operation modes with different torques, it becomes possible to apply an appropriate rotational force to the respective fastening member without causing damage to the fastening member. However, when it is needed to alternately perform the tightening operation of a relatively small-sized bolt and the loosening operation of a relatively-large-sized bolt, the suitable operation mode must be reset every time that the rotational direction of the output shaft is switched. Consequently, it will lead to a considerable decrease in working efficiency. In addition, there is a fear of deteriorating work safety at high places.

SUMMARY OF THE INVENTION

Therefore, a concern of the present invention is to provide an electric tool, by use of which different operations can be performed efficiency.

That is, the electric tool of the present invention comprises:

a reversible motor;

an output shaft rotated by the motor;

a rotational-direction switch for switching a rotational direction of the output shaft in either forward or reverse direction;

a first memory for storing a plurality of operation modes of the output shaft with respect to one of the forward and reverse directions;

an operation-mode switch for selecting one from the operation modes;

a second memory for temporarily storing an operation mode selected by the operation-mode switch in a use of the electric tool at the one of the forward and reverse directions; and a controller for automatically setting the electric tool in the operation mode stored in the second memory in the next use of the electric tool at the one of the forward and reverse directions.

In a preferred embodiment of the present invention, the plurality of operation modes with different rotational speeds or toques of the output shaft are stored in the first memory.

In addition, it is preferred that the electric tool further comprises a speed control switch for adjusting a supply amount of electric power supplied into the motor to control a rotational speed of the output shaft, and wherein the operation-mode switch is operable only when the speed control switch is not in use. In this case, it is possible to further improve the work safety because the operation mode can not be carelessly switched during the rotation of the output shaft.

Moreover, it is further preferred that the controller automatically sets the electric tool in the operation mode stored in the second memory when the electric tool is turned on under a condition that the rotational direction of the output shaft is the one of the forward and reverse directions. In this case, it is possible to save labor of repeatedly setting the same operation mode every time that the electric tool is turned on, and therefore achieve a further improvement of working efficiency.

To achieve the above-described effects of the present invention, another concern of the present invention is to provide an electric tool with at least two operation modes for providing different outputs to an object. That is, this electric tool comprises:

a main switch for selecting one from the at least two operation modes;

a first memory for storing a plurality of sub-operation modes with respect to one of at least two operation modes;

a sub switch for selecting one from the sub-operation modes;

a second memory for temporarily storing a sub-operation mode selected by the sub switch in a use of the electric tool at the one of at least two operation modes; and a controller for automatically setting the electric tool in the sub-operation mode stored in the second memory in the next use of the electric tool at the one of at least two operation modes.

These and still other objects and advantages of the present invention will become more apparent from the detail description of the invention described below.

BRIEF EXPLANATION OF THE DRAWNGS

DETAIL DESCRIPTION OF THE INVENTION

Electric tools according to preferred embodiments of the present invention are explained in detail referring to the attached figures.

Figure 1:
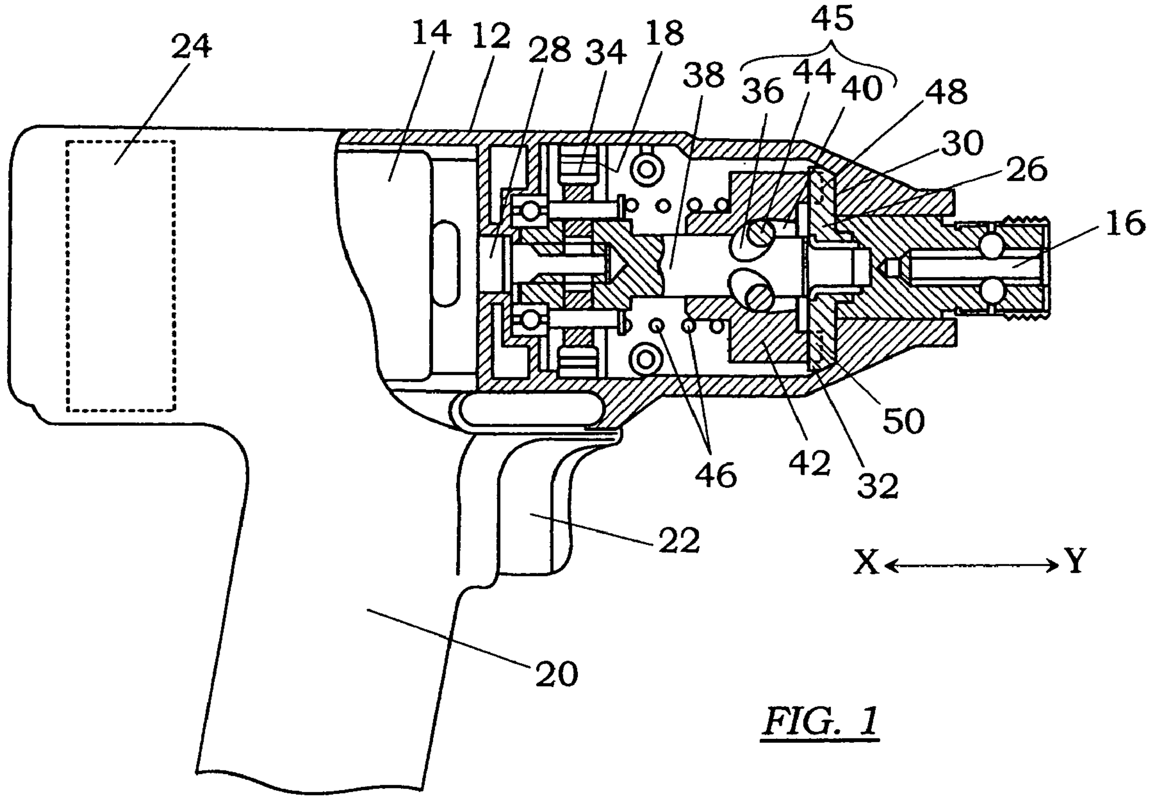
FIG. 1 is a partially cross-sectional view of an electric tool according to a preferred embodiment of the present invention.

As shown in FIG. 1, the electric tool of the present embodiment is an impact rotary tool for performing operations of tightening and loosening fastening members such as bolts, nuts and screws. This electric tool comprises a housing 12 having a grip 20 extending downwardly therefrom, a reversible motor 14 incorporated in the housing, output shaft 16 rotationally driven by the motor, power transmission device 18 for transmitting a rotational force of the motor to the output shaft, and a controller 24 electrically connected to the reversible motor through a required interface circuit.

The motor 14 can be activated by a rechargeable battery (not shown) built in the housing 12. By inverting the polarity of a voltage applied to the motor, a rotary shaft of the motor is allowed to rotate in either forward or reverse direction. One end of the output shaft 16 is projected from the housing 12, and shaped to be engageable with the fastening members.

The power transmission device 18 is composed of a planetary gear drive 34 coupled with the rotary shaft of the motor 14, drive shaft 38 having a cam 36 on the outer circumferential surface at its one end, and coupled with the planetary gear drive at the other end, hammer 42 having a hammer cam 40 in its inner peripheral portion, which is rotationally and slidably supported by the one end of the drive shaft 38, steel ball 44 disposed to straddle between the cam 36 and the hammer cam 40, so that the hammer 42 is worked together with the drive shaft 38 through the steel ball, and an elastic member 46 composed of a spring for providing a spring bias to the hammer 42 in a direction toward to the top end of the output shaft (i.e., Y direction). In addition, the hammer 42 has a pair of projections 48, 50, which can be engaged with arms (30, 32) of an anvil 26 attached to the inner surface of the housing. The cam 36, the hammer 40 and the steel ball 44 provide a cam mechanism 45.

A motion of the power transmission device 18 is explained briefly. A rotation of the motor 14 is firstly transmitted to the drive shaft 38 through the planetary gear drive 34. The rotation of the drive shaft 38 is then transmitted to the hammer 42 through the cam mechanism 45. The projections (48, 50) of the hammer 42 are engaged to the arms (30, 32) of the anvil 26 by the help of the spring bias of the elastic member 46. Since a large load is not applied to the output shaft 16 at the start of the tightening operation, the rotation of the hammer 42 can be transmitted to the anvil 26 through the engagements between the projections and the arms to rotate the output shaft 16, so that the tightening operation is started.

On the other hand, when the output shaft 16 receives the large load at the finish of the tightening operation, the hammer 42 moves backward from the cam mechanism 45 against the spring bias of the elastic member 46, and the projections (48, 50) of the hammer 42 climb over the arms (30, 32) of the anvil 26 to cancel the engagements therebetween. As a result, the hammer 42 is pushed again toward the anvil 26 by the spring bias of the elastic member, while being rotated. At this time, the projections (48, 50) are located away from the arms (30, 32). Therefore, when the hammer is further rotated, so that the projections collide with the arms to make the engagements therebetween again, a strike (impact force) is given to the anvil 26. As a result, a large rotational force is applied to the fastening member through the output shaft 16, and the fastening member can be securely fixed.

The motion of the power transmission device 18 in the operation of loosening the fastening member is substantially the same as the above except that the rotary shaft of the motor 14 is inversely rotated and the output shaft 16 receives the large load at the start of the loosening operation. This kind of the power transmission device is already introduced in Japanese Patent Early Publication No. 7-314342. Therefore, a further detail explanation thereof is omitted.

Thus, according to the above-described power transmission device 18, the electric tool has the capability of selectively performing the operations of tightening and loosing the fastening members by switching the rotational direction of the motor, and also intermittently giving a magnitude of strike to the fastening member at the finish of the tightening operation or at the start of the loosening operation.

Figure 2:
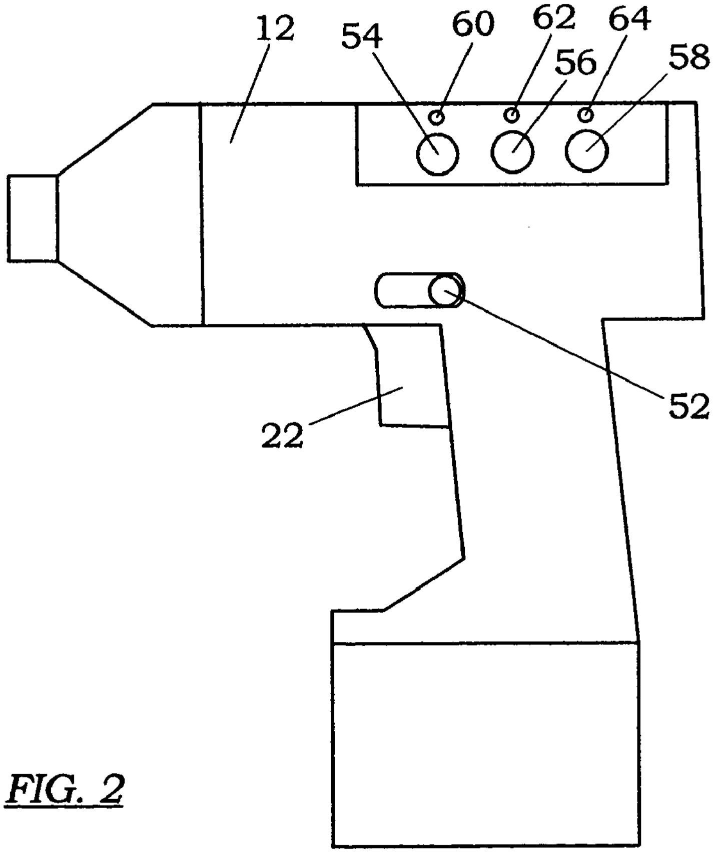
FIG. 2 is a side view of the electric tool.

In addition, as shown in FIG. 2, this electric tool has a slide switch 52 for switching the rotational direction of the rotary shaft of the motor 14 in either forward or reverse direction, push switches (54, 56, 58) for selecting one from a plurality of operation modes (M1, M2, M3) described later, trigger 22 for adjusting a rotational speed of the rotary shaft of the motor according to an amount of trigger movement in each of the operation modes, and light emitting diodes (LED) 60, 62, 64 for visually informing the selected operation mode to the user. The trigger 22 is also used to turn on/off the electric tool.

Figure 3:
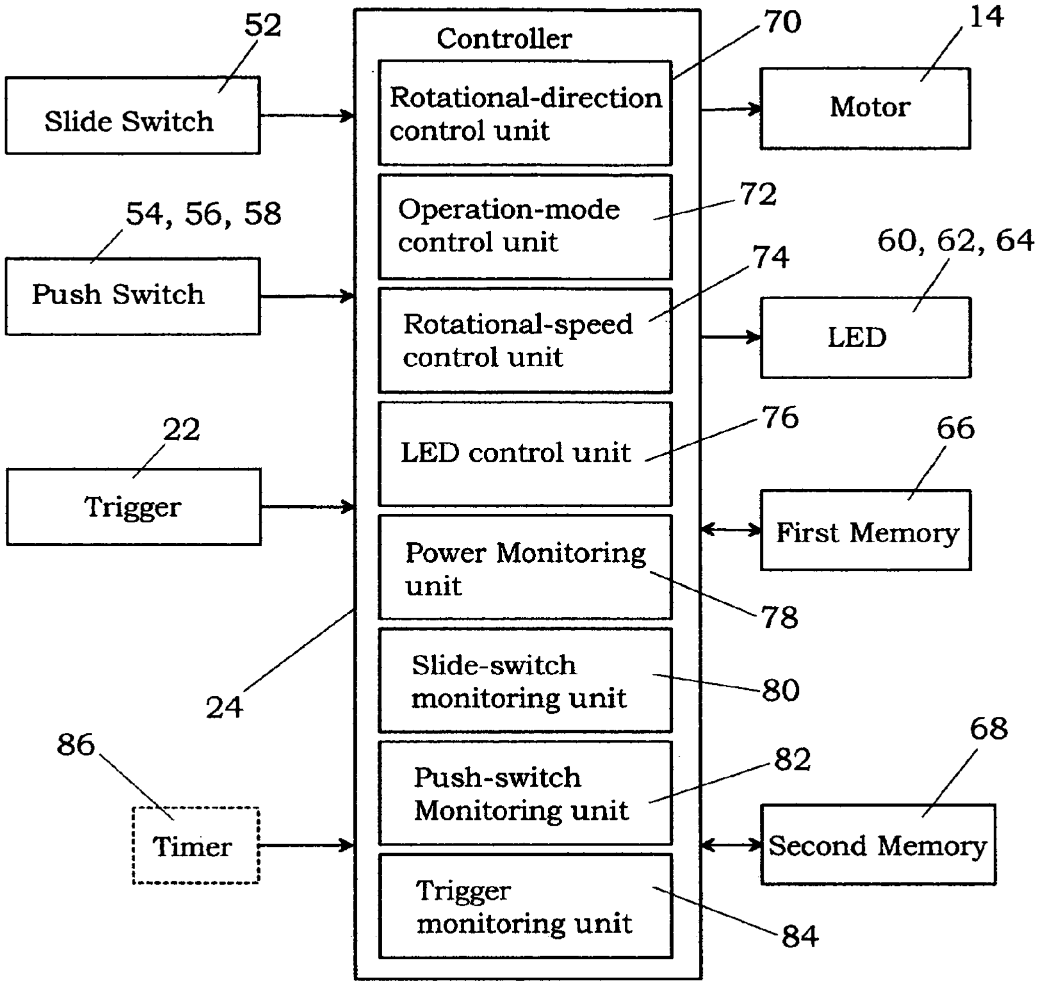
FIG. 3 is a block diagram of a controller of the electric tool.

As shown in FIG. 3, the controller 24 of the electric tool is composed of a microcomputer, and comprises a, CPU having a required operation processing capability, ROM for storing required program software and data, and a RAM for temporarily storing data.

Specifically, the controller 24 comprises a rotational-direction control unit 70, operation-mode control unit 72, rotational-speed control unit 74, LED control unit 76, power monitoring unit 78, slide-switch monitoring unit 80, push-switch monitoring unit 82, and a trigger monitoring unit 84. The controller 24 is connected to the motor 14, LED (60, 62, 64), slide switch 52, push switches (54, 56, 58), and the trigger 22 through required interface circuits. In addition, the controller 24 is connected to a first memory 66 for storing the operation modes M1 to M3, and a second memory 68 for temporarily storing an operation mode selected by the push switches in a use of the electric tool at each of the opposite rotational directions of the motor.

Figure 4:
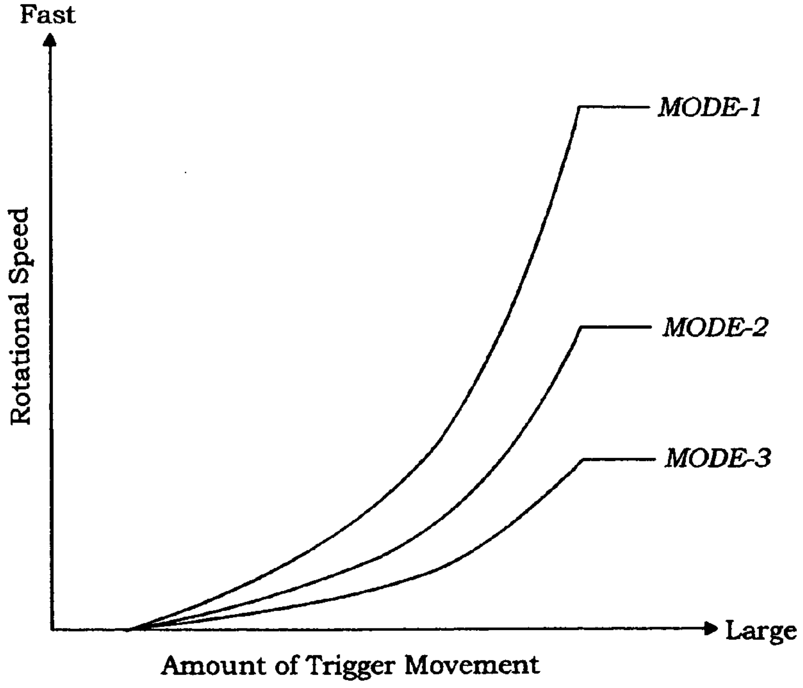
FIG. 4 is a graph showing three operation modes with different rotational speeds of an output shaft of the electric tool.
Figure 5:
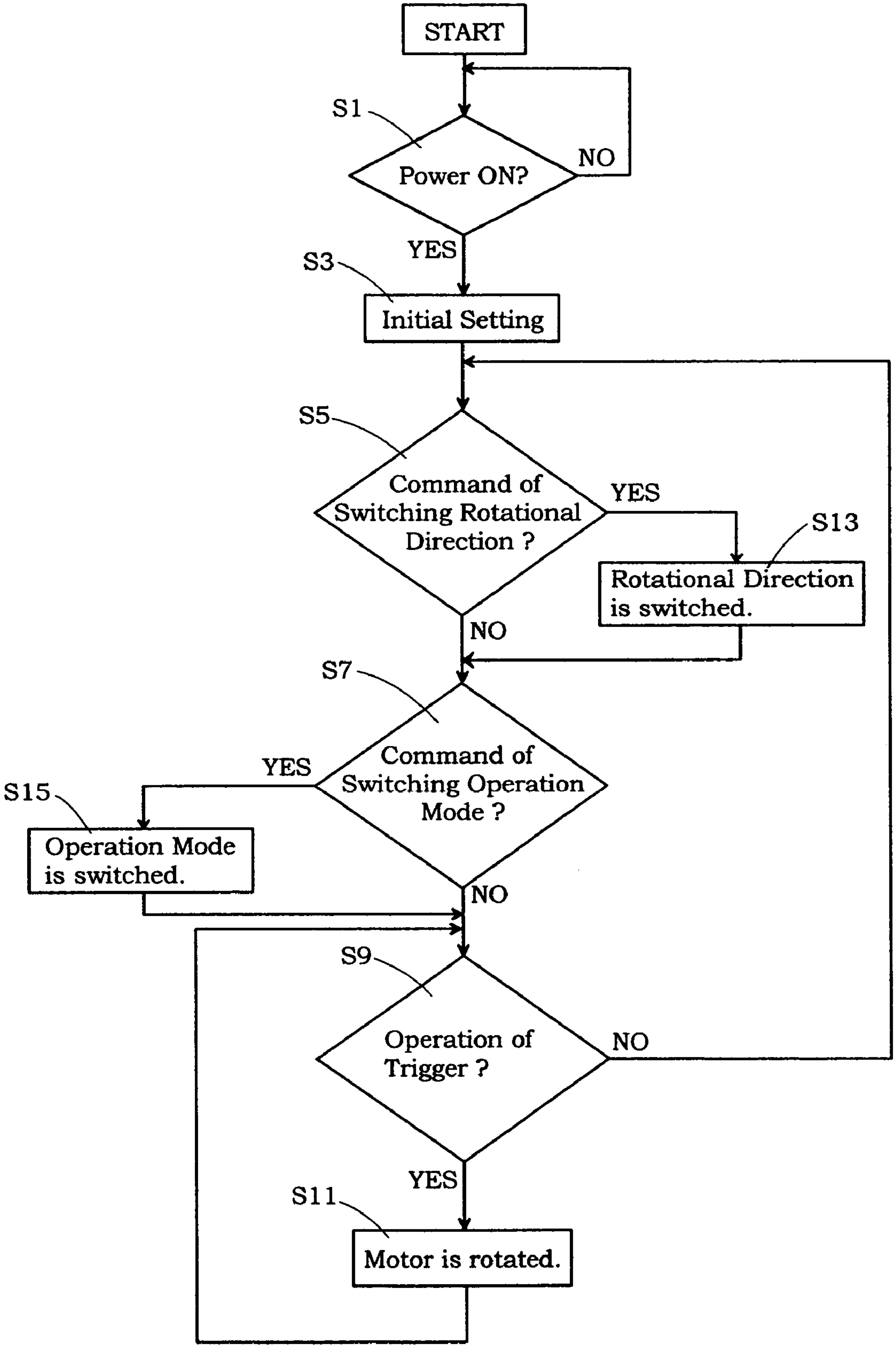
FIG. 5 is a flow chart explaining a motion of the electric tool.

In this embodiment, the first memory 66 stores three operation modes M1 to M3 having different relationships (i.e., stroke curves) between the amount of trigger movement and the rotational speed of the motor 14, as shown in FIG. 4. That is, the operation mode M1 is preferably selected in the case of needing a relatively large rotational force of the output shaft. The operation mode M2 is preferably selected in ordinary use. The operation mode M3 is preferably selected in the case of needing a relative small rotational force of the output shaft to avoid the occurrence of damage to the fastening member.

According to a signal output by operating the slide switch 52, the rotational-direction control unit 70 inverts the polarity of the voltage supplied to the motor to switch the rotational direction of the output shaft in either forward or reverse direction. According to a signal output by operating a desired one of the push switches (54, 56, 58), the operation-mode control unit 72 sets the electric tool in a corresponding one of the operation modes M1 to M3 stored in the first memory 66. For example, when the push switch 54 is pushed, the operation mode M1 is selected, so that data for the operation mode M1 is sent to the RAM of the controller. According to a signal level output in response to the amount of trigger movement, the rotational-speed control unit 74 regulates the voltage value supplied to the motor 14.

When one of the push switches is manually operated by the user, a corresponding LED is lighted by the LED control unit 76. As described later, even when the operation mode is automatically set, the LED corresponding to the operation mode is lighted by the LED control unit 76. Since the user can visually check the present operation mode, a further improvement of work safety is achieved.

According to a signal output by operating the trigger 22, the power monitoring unit 78 checks that the electric tool is in the ON-state. According to a signal output by operating the slide switch 52, the slide-switch monitoring unit 80 checks the presence or absence of a command of switching the rotational direction of the motor. According to a signal output by operating any one of the push switches (54, 56, 58), the push-switch monitoring unit 82 checks the presence or absence of a command of switching the operation mode. According to a signal output by operating the trigger 22, the trigger monitoring unit 84 checks the presence or absence of the operation of the trigger.

The second memory 68 is, for example, composed of an EEPROM (Electrically Erasable Read Only Memory) that is an electrically rewritable memory. When the operation mode is switched by operating any one of the push switches in a use of the electric tool at one of the opposite rotational directions (forward and reverse directions) of the motor, the second memory 68 temporarily stores the selected operation mode in conjunction with information of the corresponding rotational direction. The data stored in the second memory can be renewed every time that the rotational direction is switched.

For example, when the electric tool is used in the operation mode M2 under the condition that the rotational direction of the output shaft 16 is the forward direction, and then the slide switch 52 is operated to set the rotational direction in the reverse direction, the operation mode M2 is temporarily stored in the second memory 66. In addition, when the operation mode of the electric tool is switched to the operation mode M3 by operating one of the push switches under the condition that the rotational direction of the output shaft is the reverse direction, and then the slide switch is operated to set the rotational direction in the forward direction, the controller 24 automatically sets the electric tool in the previous operation mode M2 stored in the second memory with respect to the forward direction. Furthermore, when the push switch for the operation mode M3 is operated, and then the slide switch is operated to set the rotational direction in the reverse direction, the data stored in the second memory is renewed, so that the operation mode M3 is stored as the previous operation mode in the second memory. Similarly, every time that the rotational direction of the output shaft is switched from the reverse direction to the forward direction, data of the operation mode with respect to the reverse direction is renewed in the second memory.

In addition, it is preferred that when the electric tool is turned on under the condition that the rotational direction of the output shaft is the forward (or reverse) direction, the controller 24 automatically sets the electric tool in the previous operation mode temporarily stored in the second memory 68 with respect to the forward (or reverse) direction. That is, when the electric tool is turned on by operating the trigger 22, the rotational direction of the motor 14 is set in the rotational direction corresponding to the position of the slide switch 52, and the operation mode is automatically set in the previous operation mode stored in the second memory 68 with respect to the rotational direction.

For example, when the electric tool is used in the operation mode M3 under the condition that the rotational direction of the motor is the forward direction, and then the slide switch 52 is operated to set the rotational direction in the reverse direction, the operation mode M3 is temporarily stored in the second memory with respect to the forward direction. In addition, when the electric tool is used in the operation mode M1 under the condition that the rotational direction of the motor is the reverse direction, and it is turned off, the operation mode M1 is temporarily stored in the second memory with respect to the reverse direction. In a next use of the electric tool, when the trigger 22 is operated to turn on the electric tool under that the rotational direction of the motor is set in forward direction by the slide switch 52, the controller 24 automatically sets the electric tool in the previous operation mode M3 stored in the second memory with respect to the forward direction. Similarly, when the trigger is operated to turn on the electric tool under that the rotational direction of the motor is set in reverse direction by the slide switch, the controller 24 automatically sets the electric tool in the operation mode M1 stored in the second memory with respect to the reverse direction.

Alternatively, when the electric tool is turned on, it is preferred to forcedly set a predetermined operation mode without using the previous operation data temporarily stored in the second memory. For example, when the electric tool is turned on under the condition that the rotational direction of the motor is set in the forward direction, the operation mode M2 is forcedly set because a moderate rotational force is sufficient to perform the tightening operation, and when the electric tool is turned on under the condition that the rotational direction of the motor is set in the reverse direction, the operation mode M1 is forcedly set because a relatively large rotational force is usually needed to perform the loosening operation.

A timer 86 may be connected to the controller 24 through a required interface circuit. For example, when the trigger 22, slide switch 52 and/or the push switches (54, 56, 58) is not operated for a constant time period preset in the timer, the electric tool can be reset in an initial state (e.g., a state set at the factory) by erasing the previous data stored in the second memory 68. The timer 86 may be built in the microcomputer used for the controller 24.

The electric tool of this embodiment is further explained referring to the flow chart shown in IFG. 5. First, the power monitoring unit 78 checks as to whether the electric tool is in the ON or OFF state (S1). Once the electric tool is turned on by operating the trigger 22, the ON state is maintained even if the operation of the trigger is discontinued for a constant time period.

Next, an initial setting of the controller 24 is performed (S3). In this step, the rotational direction of the motor 14 is set in the forward or reverse direction corresponding to the position of the slide switch 52. In addition, the electric tool is automatically set in the operation mode temporarily stored in the second memory with respect to the set rotational direction. For example, when the slide switch 52 is positioned to select the forward direction, the electric tool is automatically set in the previous operation mode stored in the second memory 68 with respect to the forward direction.

Next, the slide-switch monitoring unit 80 checks the presence or absence of the command of switching the rotational direction of the motor 14, which can be provided by operating the slide switch (S5). In the absence of the command, the push-switch monitoring unit 82 checks the presence or absence of the command of switching the operation mode, which can be provided by operating any one of the push switches (S7). In the absence of the command, the trigger monitoring unit 84 checks the amount of trigger movement (S9).

When the amount of the trigger movement is detected, the output shaft is driven (S11) at the rotational speed corresponding to the amount of the trigger movement under the conditions of the rotational direction and the operation mode initially set in the step S3. This rotation of the output shaft is continued unless the trigger operation is cancelled.

When the trigger 22 is not operated for the constant time period in the step S9, it gives way to the step S5. For example, when the command of switching the rotational direction of the motor in the reverse direction is detected in the step S5, the rotational-direction control unit 70 sets the rotational direction in the reverse direction (S13). When there is no command of switching the operation mode in the step S7, it gives way to the step S9. When the amount of the trigger movement is detected in the step S9, the output shaft is driven (S11) at the rotational speed corresponding to the amount of the trigger movement in the previous operation mode stored in the second memory with respect to the reverse direction set in the step 13.

When the command of switching the operation mode is detected in the step S7, the operation-mode control unit 72 sets the electric tool in the operation mode corresponding to the command. Then, when the amount of the trigger movement is detected in the step S9, the output shaft is driven (S11) at the rotational speed corresponding to the amount of the trigger movement in the operation mode set in the step S15. According to this change of the operation mode, data stored in the second memory is renewed. For example, the data renewal of the second memory can be performed at the stage that the command of switching the operation mode is generated by operating one of the push switches.

Thus, the data renewal of the second memory is not performed until the operation mode is manually switched by operating one of the push switches. Therefore, the electric tool is automatically set in the previous operation mode corresponding to the rotational direction stored in the second memory every time that the rotational direction is switched. Consequently, it leads to a considerable decrease in the number of times of manually switching the operation modes while at work, so that an improvement of the working efficiency is achieved.

It is preferred that the push switches are operable only when it is checked by the trigger monitoring unit 84 that the trigger 22 is not in use. In this case, it is possible to achieve an improvement of the work safety because the operation mode can not be carelessly switched during the rotation of the output shaft.

Figure 6:
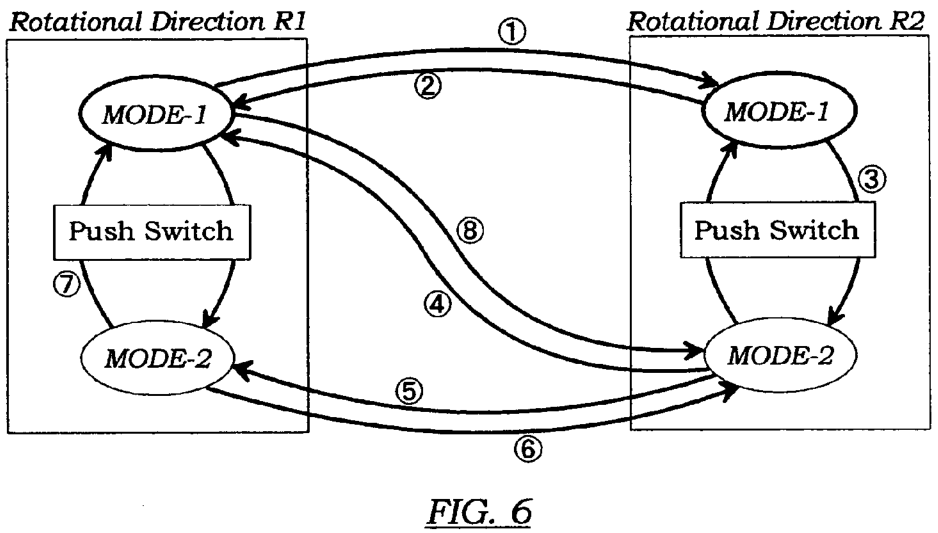
FIG. 6 is a schematic view illustrating the motion of the electric tool.
Figure 7:
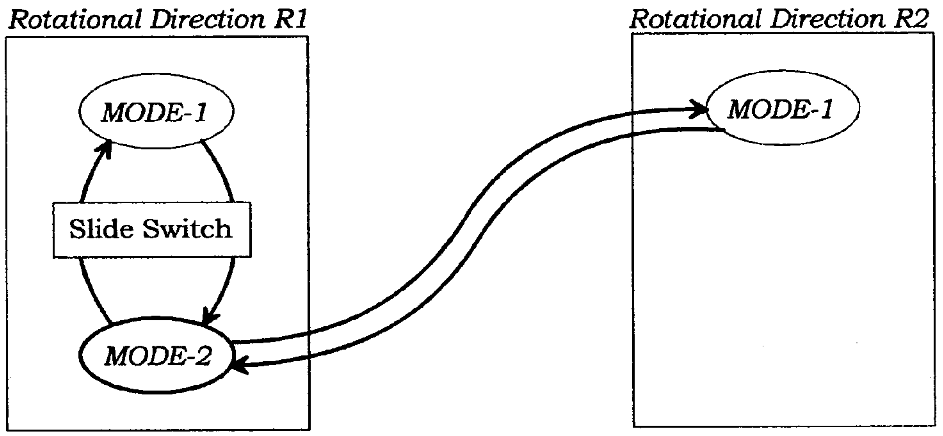
FIG. 7 is a schematic view illustrating a motion of another electric tool of the present invention.
Figure 8:
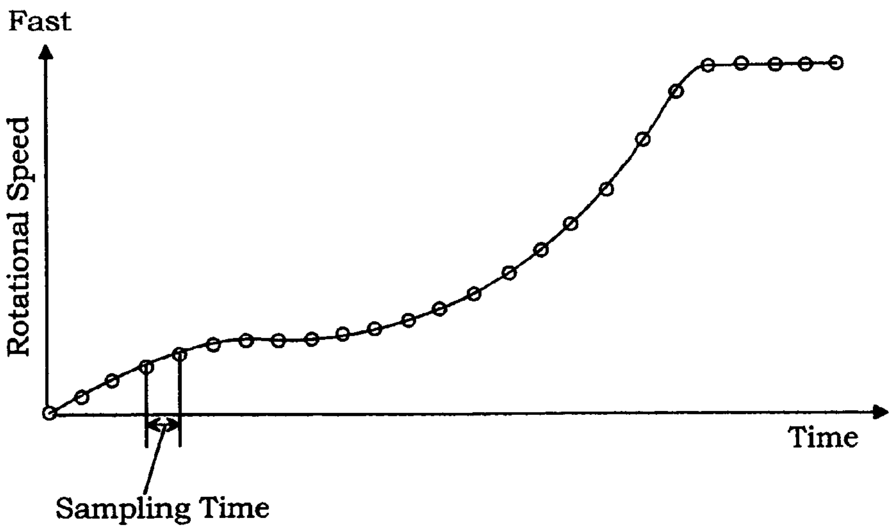
FIG. 8 is a graph showing a relationship between rotational speed of the output shaft and time of trigger operation.

In addition, operations of electric tools of the present invention are further explained referring to FIGS. 6 to 8. For example, when the rotational direction of the motor is switched from the direction R1 to the direction R2 under the condition that the operation mode is in the MODE-1, as shown by the arrow ①, the operation mode (MODE-1) is temporarily stored with respect to the direction R1 in the second memory. Then, when the rotational direction of the motor is switched again from the direction R2 to the direction R1, the electric tool is automatically set in the MODE-1, as shown by the arrow ②.

In addition, when the rotational direction of the motor is switched from the direction R1 to the direction R2 under the condition that the operation mode is in the MODE-1, as shown by the arrow ①, the operation mode (MODE-1) is temporarily stored with respect to the direction R1 in the second memory. In addition, when the operation mode is switched from the MODE-1 to the MODE-2 under the condition the rotational direction of the motor is in the direction R2, as shown by the arrow ③, and then the rotational direction of the motor is switched again from the direction R2 to the direction R1, the electric tool is automatically set in the MODE-1 that is the previous operation mode stored with respect to the rotational direction R1 in the second memory, as shown by the arrow ④.

Similarly, when the rotational direction of the motor is switched from the direction R2 to the direction R1 under the condition that the operation mode is in the MODE-2, as shown by the arrow ⑤, the operation mode (MODE-2) is stored with respect to the direction R2 in the second memory. Then, when the rotational direction of the motor is switched again from the direction R1 to the direction R2, the electric tool is automatically set in the MODE-2, as shown by the arrow ⑥.

In addition, when the rotational direction of the motor is switched from the direction R2 to the direction R1 under the condition that the operation mode is in the MODE-2, as shown by the arrow ⑤, the operation mode (MODE-2) is stored with respect to the direction R2 in the second memory. In addition, when the operation mode is switched from the MODE-2 to the MODE-1 under the condition the rotational direction of the motor is in the direction R1, as shown by the arrow ⑦, and then the rotational direction of the motor is switched again from the direction R1 to the direction R2, the electric tool is automatically set in the MODE-2 that is the previous operation mode stored with respect to the rotational direction R2 in the second memory, as shown by the arrow ⑧.

FIG. 7 shows a case that the operation mode is fixed to the MODE-1 under the condition that the rotational direction of the motor is in the direction R2, and the MODE-2 is the previous operation mode stored with respect to the rotational direction R1 in the second memory.

The present invention is not limited to the electric tool described above. For example, the following modifications may be made, if necessary.

(1) The electric tool of the present invention is not limited to the impact rotary tool, and extends to various types of electric tools such as a drill driver for providing an output to an object through an output shaft rotationally driven by a reversible motor. In addition, it is widely available to any electric tool with at least two operation modes for providing different outputs to the object.

(2) In place of the LED, a liquid crystal display panel may be mounted in the outer surface of the housing to visually provide detail information of the operation mode to the user. Alternatively, the electric tool may have a speaker for providing the information of the operation mode to the user by an audio output.

(3) There is no limitation with respect to the number of the operation modes stored in the first memory. For example, it may be four or more.

(4) In place of the relationship shown in FIG. 4, it is preferred that the rotational speed at each of sampling times on the time axis (horizontal axis) is stored in the first memory, as shown in FIG. 8, and the motor is rotated according to the speed curve along the time axis by operating the trigger. Therefore, the operation mode in this case is defined by the relationship between the operating time of the trigger and the rotational speed. For example, a playback-mode setting switch may be provided adjacent to the push switches. When the playback-mode setting switch is turned on, the motor can be rotated according to the above operating mode by operating the trigger.

What is claimed is:

1. An electric tool comprising:

a reversible motor;

an output shaft rotated by said motor;

a rotational-direction switch for switching a rotational direction of said output shaft in either forward or reverse direction;

a first memory for storing a plurality of operation modes of said output shaft with respect to one of said forward and reverse directions;

an operation-mode switch for selecting one from said operation modes;

a second memory for temporarily storing an operation mode selected by said operation-mode switch in a previous operation of the electric tool at the one of said forward and reverse directions in conjunction with the information of the rotational direction in the previous operation; and a controller for automatically setting the electric tool in the operation mode temporarily stored in said second memory in a current operation of the electric tool, in which the same rotational direction as the previous operation is selected.

2. The electric tool as set forth in claim 1, wherein said plurality of operation modes with different rotational speeds of said output shaft are stored in said first memory.

3. The electric tool as set forth in claim 1, wherein said plurality of operation modes with different torques of said output shaft are stored in said first memory.

4. The electric tool as set forth in claim 1, further comprising a speed control switch for adjusting a supply amount of electric power supplied into said motor to control a rotational speed of said output shaft, and wherein said operation-mode switch is operable only when said speed control switch is not in use.

5. The electric tool as set forth in claim 1, wherein said controller automatically sets the electric tool in the operation mode stored in said second memory when the electric tool is turned on under a condition that the rotational direction of said output shaft is the one of said forward and reverse directions.

6. The electric tool as set forth in claim 1, wherein said controller automatically sets the electric tool in the operation mode stored in said second memory when the rotational direction of said output shaft is switched to the one of said forward and reverse directions by said rotational-direction switch.

7. The electric tool as set forth in claim 1, wherein said first memory stores the plurality of operation modes of said output shaft with respect to each of said forward and reverse directions, and said second memory temporarily stores the operation mode selected by said operation-mode switch in the use of the electric tool at each of said forward and reverse directions.

8. The electric tool as set forth in claim 1, further comprising a housing having a grip, in which said reversible motor, a power transmission device through which an input of said reversible motor is converted into the rotation of the output shaft, said first and second memories, and said controller are accommodated.

9. An electric tool with at least two operation modes for providing different outputs to an object comprising:

a main switch for selecting one from said at least two operation modes;

a first memory for storing a plurality of sub-operation modes with respect to one of said at least two operation modes;

a sub switch for selecting one from said sub-operation modes;

a second memory for temporarily storing a sub-operation mode selected by said sub switch in a previous operation of the electric tool at the one of said at least two operation modes in conjunction with information of the operation mode in the previous operation; and a controller for automatically setting the electric tool in the sub-operation mode temporarily stored in said second memory in a current operation of the electric tool, in which the same operation mode as the previous operation is selected.

* * * * *